United States Patent [19]
Hasegawa et al.

[11] Patent Number: 5,683,822
[45] Date of Patent: Nov. 4, 1997

[54] LIQUID-PHASE DIFFUSION BONDING ALLOY FOILS FOR JOINING HEAT-RESISTANT METALS IN OXIDIZING ATMOSPHERES

[75] Inventors: Yasushi Hasegawa; Hisashi Naoi; Yuuichi Satoh; Hiroshi Ukeba, all of Futtsu, Japan

[73] Assignee: Nippon Steel Corporation, Tokyo, Japan

[21] Appl. No.: 716,183

[22] PCT Filed: Apr. 6, 1995

[86] PCT No.: PCT/JP95/00673

§ 371 Date: Sep. 27, 1996

§ 102(e) Date: Sep. 27, 1996

[87] PCT Pub. No.: WO95/27586

PCT Pub. Date: Oct. 19, 1995

[30] Foreign Application Priority Data

Apr. 6, 1994 [JP] Japan ................................. 6-068807

[51] Int. Cl.$^6$ .......................... B23K 20/00; C22C 19/05; C22C 30/00
[52] U.S. Cl. .................. 428/606; 428/679; 428/680; 148/403; 420/451; 420/448; 420/588; 228/262.4; 228/262.41; 228/262.3; 228/195
[58] Field of Search .......................... 420/451, 448, 420/588; 228/262.4, 262.41, 262.3, 195, 194; 428/606, 679, 680; 148/403, 428, 429, 410, 419, 442

[56] References Cited

U.S. PATENT DOCUMENTS

| | | |
|---|---|---|
| 3,188,203 | 6/1965 | Peaslee et al. ........................... 428/680 |
| 3,856,513 | 12/1974 | Chen et al. . |
| 4,148,973 | 4/1979 | Sexton et al. . |
| 4,283,225 | 8/1981 | Sexton et al. . |
| 4,302,515 | 11/1981 | DeCristofaro et al. . |
| 4,314,661 | 2/1982 | DeCristofaro et al. . |
| 4,316,572 | 2/1982 | Sexton et al. . |
| 4,745,037 | 5/1988 | DeCristofaro et al. . |

FOREIGN PATENT DOCUMENTS

| | | |
|---|---|---|
| 53-81458 | 7/1978 | Japan . |
| 58-135782 | 8/1983 | Japan . |
| 61-231139 | 10/1986 | Japan . |
| 62-34685 | 2/1987 | Japan . |
| 62-227595 | 10/1987 | Japan . |
| 62-297435 | 12/1987 | Japan . |
| 63-89644 | 4/1988 | Japan . |
| 2-151378 | 6/1990 | Japan . |
| 3-13953 | 2/1991 | Japan . |
| 3-240935 | 10/1991 | Japan . |
| 5-98394 | 4/1993 | Japan . |
| 6-9747 | 2/1994 | Japan . |
| 6-9748 | 2/1994 | Japan . |
| 6-170584 | 6/1994 | Japan . |
| 2128633 | 5/1984 | United Kingdom . |

*Primary Examiner*—David A. Simmons
*Assistant Examiner*—Margery S. Phipps
*Attorney, Agent, or Firm*—Kenyon & Kenyon

[57] ABSTRACT

Alloy foils for liquid-phase diffusion bonding of heat-resisting metals in an oxidizing atmosphere comprise 6.0 to 15.0 percent silicon, 0.1 to 2.0 percent manganese, 0.50 to 30.0 percent chromium, 0.10 to 5.0 percent molybdenum, 0.50 to 10.0 percent vanadium, 0.02 to 1.0 percent niobium, 0.10 to 5.0 percent tungsten, 0.05 to 2.0 percent nitrogen, 0.50 to 20.0 percent phosphorus, plus 0.005 to 1.0 percent carbon, and/or either or both of 0.01 to 5.0 percent titanium and 0.01 to 5.0 percent zirconium, all by mass, with the balance comprising nickel and impurities, and have a thickness of 3.0 to 300 μm. Alloy foils for liquid-phase diffusion bonding of heat-resisting metals in an oxidizing atmosphere are also available with substantially vitreous structures.

8 Claims, 7 Drawing Sheets

LIQUID-PHASE DIFFUSION BONDING ALLOY FOILS FOR JOINING HEAT-RESISTANT METALS IN OXIDIZING ATMOSPHERES

TECHNICAL FIELD

This invention relates to liquid-phase diffusion bonding of metals, and more specifically to liquid-phase diffusion bonding materials suited for the liquid-phase diffusion bonding of heat-resisting steels and alloy steels or between heat-resisting alloy steels and carbon steels in oxidizing atmospheres that form joints having high bonding strength and good creep characteristics at high temperatures.

BACKGROUND OF THE INVENTION

Liquid-phase diffusion bonding is carried out by inserting between the materials to be joined an alloy having a melting point lower than that of the materials to be joined and an eutectic composition in the form of foil, powder or plated coating. Bonding is achieved by applying pressure and heating to a temperature just above the liquidus line of the inserted alloy (hereinafter called the inserted metal). This is a kind of solid-phase bonding in which the bond is completed by melting and isothermal solidification.

Liquid-phase diffusion bonding is used where residual stress and deformation must be avoided as far as possible and also for joining high-alloy and heat-resisting steels that are difficult to weld.

The metals to be bonded by liquid-phase diffusion bonding often contain 0.50 percent or more chromium. Chromium-bearing steels generally have high oxidation and corrosion resistance because of the coherent films of chromium oxide (mostly as $Cr_2O_3$) formed on the surface. The heat applied for bonding forms oxide films on the surface of the bond which inhibit the wetting of the inserted metal and significantly prevent the diffusion of atoms required for the completion of the bond.

It has therefore been necessary to carry out liquid-phase diffusion bonding in a vacuum or in an inert or a reducing atmosphere, as disclosed in Japanese Provisional Patent Publications Nos. 81458 of 1978, 34685 of 1987 and 227595 of 1987. This requirement has greatly increased the bonding cost.

By making many studies, the inventors found that liquid-phase diffusion bonding can be carried out in oxidizing atmospheres if the inserted metal contains vanadium. Although vanadium raises the melting point of the inserted metal, it was also found that the vanadium-bearing inserted metal can have an excellent bondability when other elements (such as silicon that is controlled in this invention) are properly controlled.

Practically no vanadium-bearing alloy foils, which increased silicon contents, for liquid-phase diffusion bonding have been proposed. U.S. Pat. No. 3,856,513 discloses alloys having a composition MaYbZc. M is a metal selected from the group comprising iron, nickel, cobalt, vanadium and chromium, Y is an element selected from the group comprising phosphorus, boron and carbon, Z is an element selected from the group comprising aluminum, silicon, tin, germanium, indium, antimony and beryllium, a is in the range of approximately 60 to 90 atomic percent, b is in the range of approximately 10 to 30 atomic percent, and c is in the range of approximately 0.1 to 15 atomic percent. Alloys of this type have been manufactured on an industrial scale by rapidly cooling molten products with conventional technologies.

Being amorphous, with vanadium used as the base component, these alloys are not intended as alloy foils for bonding. Besides, it is extremely difficult to achieve liquid-phase diffusion bonding with this type of alloys whose silicon contents are low and melting points are considerably higher than the foils according to this invention. The boron content of this alloy is entirely different from that of the foils according to this invention. Because of the high boron content, coarse precipitates are formed in the molybdenum- or chromium-bearing metal near the bond. The resulting bond has a much lower strength than the bonds formed by the use of the foils according to this invention. Japanese Provisional Patent Publication No.81458 of 1978 discloses the foil of the alloy according to U.S. Pat. No. 3,856,513. Containing no vanadium at all, however, this foil does not permit liquid-phase diffusion bonding in an oxidizing atmosphere.

Based upon the above knowledge, the inventors discovered that liquid-phase diffusion bonding in oxidizing atmospheres is possible by using an inserted metal containing 0.1 to 20.0 atomic percent vanadium, with the addition of silicon. The technology to provide the alloy foils suited for liquid-phase diffusion bonding in oxidizing atmospheres disclosed in Japanese Provisional Patent Publication No. 151378 of 1990 is based on the above discovery. This alloy contains 0.5 to less than 10.0 atomic percent boron, 15.0 to 30.0 atomic percent silicon, 0.1 to 20.0 atomic percent vanadium, one or two elements selected from group (A) comprising 0.1 to 20.0 atomic percent chromium, 0.1 to 20.0 atomic percent iron and 0.1 to 20.0 atomic percent molybdenum, and/or one or two elements selected from the group (B) comprising 0.1 to 10.0 atomic percent tungsten and 0.1 to 10.0 atomic percent cobalt, with the remainder essentially comprising nickel and inherent impurities. This alloy is substantially vitreous and provided in the form of foils having a thickness of 3.0 to 120 μm.

Because of the increasing straining global energy and environmental problems, power plants today are operating under much severer conditions than before. Especially the temperature and pressure of operating steam are so high that commercially marketed conventional steels are no longer suit ed for use with extra-super critical pressure power plants that will be constructed in the future.

The creep strength of heat-resisting steels is governed by solid-solution strengthening when aging time is short and by precipitation strengthening when aging time is long. The solid-solution strengthening elements forming solid solutions in steel first precipitate as $M_{23}C_6$ and other stable carbides as a result of aging. When aging time is longer, the precipitates coalesce and coarsen, thus lowering the creep strength. To maintain the creep strength of heat-resisting steels at a high level, many studies have been made about methods for keeping the solid-solution strengthening elements in them in the form of solid solutions for a long time, without causing precipitation.

For example, Japanese Provisional Patent Publications Nos. 89644 of 1988, 231139 of 1986 and 297435 of 1987 disclose that the use of tungsten as a solid-solution strengthening element permits the attainment of ferritic heat-resisting steels having much higher creep strength than the conventional molybdenum-added ferritic heat-resisting steels. Many of these steels are single phase of tempered martensite. With the advantage of ferritic steels having good resistance to oxidation by steam combined with high strength, these steels are expected to find use as the next-generation materials for high-temperature and high-pressure service environments.

Nitrogen has high oxidation resistance and fine precipitates of nitrides improve high-temperature creep strength. Thus, new "high-nitrogen steels" having higher high-temperature strength and corrosion resistance than the conventional carbon-strengthened steels are being studied and developed. The inventors proposed high-strength heat-resisting ferritic steels with higher nitrogen contents in Japanese Provisional Patent Publications Nos. 240935 of 1991 and 098394 of 1992.

Because of their increased high-temperature strength, however, the heat-resisting steels just described are difficult to weld. Especially the weld metal and welded bond have a tendency to become harder. Some of such ferritic heat-resisting steels do not satisfy safety standards unless long post-welding heat treatment is applied.

When metals with higher nitrogen contents are welded, nitrogen is dissipated and lost into the atmosphere from the weld metal or the welded base metal. The resulting decrease in nitrogen content in the welded joint or the nearby bond or heat-affected zone causes a lowering of strength. A decrease in austenite equivalent causes delta ferrite to form in the steel. The resulting loss of a homogeneous martensitic or austenitic structure seriously impairs the strength and corrosion resistance of the welded joint. The welded joint does not have as high a nitrogen content as the base metal, with the excellent properties of the base metal lost in a localized region.

Some boiler plants recently planned use urban wastes and other matters or chemical substances as fuels. The boilers to be used in such highly corrosive environments require pipes of nickel-base alloys or double pipes consisting of one pipe of these alloys and the other pipe of new ferritic heat-resisting steels mentioned earlier. However, there has been no effective ways to join together pipes of these high corrosion-resistance steels. The conventionally available has been costly because it comprises the steps of depositing large quantities of very expensive nickel-base alloys by simple buildup welding, applying heat treatment to the entire length of the steel pipe, forming a groove for welding, and then applying welding.

Effective industrial technologies to join together such difficultly weldable materials have been long awaited and enormous amounts of time and money have been spent in their studies.

One of the most promising solutions is the liquid-phase diffusion bonding methods including the one according to this invention. Liquid-phase diffusion bonding has been applied for trials to, for example, rocket engine nozzles and space-craft landing gears of titanium alloys used in high-temperature environments and requiring adequate high-temperature strength and a high degree of reliability. Still, liquid-phase diffusion bonding has not been used in the construction of power plants.

Particularly, the conventional nickel-base alloy foils for liquid-phase diffusion bonding do not provide uniform mechanical properties when it is used for bonding new high-strength or high-nitrogen heat-resisting steels containing tungsten because of the great difference in alloy constituents therebetween. Furthermore, it cannot be carried out in an oxidizing atmosphere. As is obvious from their chemical compositions, it is impossible to achieve sound bonding at low cost.

This invention provides a solution for the problems that have been impossible for the conventional problems to solve. More specifically, this invention provides a new liquid-phase diffusion bonding technology for joining heat-resisting steels and heat-resisting steel pipes used in high-temperature environments. The object of this invention is to provide alloy foils for liquid-phase diffusion bonding that permit producing bonded joints having a high degree of reliability and heat resistance by carrying out liquid-phase diffusion bonding in oxidizing atmospheres.

SUMMARY OF THE INVENTION

The object of this invention that is based on the above discovery is to provide liquid-phase diffusion bonding alloy foils for joining heat-resisting metals in oxidizing atmospheres comprising 6.0 to 15.0 mass percent silicon, 0.1 to 2.0 mass percent manganese, 0.50 to 30.0 mass percent chromium, 0.10 to 5.0 mass percent molybdenum, 0.50 to 10.0 mass percent vanadium, 0.02 to 1.0 mass percent niobium, 0.10 to 5.0 mass percent tungsten, 0.05 to 2.0 mass percent nitrogen, 0.50 to 20.0 mass percent phosphorus, and, as required, 0.005 to 1.0 mass percent carbon, the ratio in mass percent of carbon to nitrogen being less than 1, and either or both of 0.01 to 5.0 mass percent titanium and 0.01 to 5.0 mass percent zirconium, with the remainder comprising nickel and impurities and having a thickness of 3.0 to 300 µm or liquid-phase diffusion bonding alloy foils for joining heat-resisting metals in oxidizing atmospheres having the same composition and having a substantially vitreous nature.

The term "oxidizing atmospheres" as used in this invention means the atmospheres containing not less than 0.1 volume percent oxygen gas and having a partial pressure of oxygen of not lower than $10^3$ atm. Even a reducing gas, such as one containing hydrogen gas, hydrogen sulfide or water vapor, is an oxidizing atmosphere if its oxidizing power is equivalent to an oxygen concentration of not less than 0.1 percent.

The term "melting point" means the solidus line in the equilibrium diagram of alloys composed of two or more principal metallic components, unless otherwise stated.

DESCRIPTION OF THE PREFERRED EMBODIMENTS

The following is a detailed description of this invention.

First, the reason for limiting the contents of alloying constituents as described before is given below.

Silicon is an element that effectively lowers the melting point of nickel that constitutes the matrix of the alloys according to this invention. The alloy foils according to this invention have relatively high melting points because of the characteristically high contents of vanadium. To avoid the resulting lengthening of the bonding time, not less than 6.0 percent silicon must be added. If over 15.0 percent silicon is added, however, coarse oxides containing silicon are formed in the inserted metal when liquid-phase diffusion bonding is carried out in oxidizing atmospheres, thereby impairing the strength and toughness of the bonded joint. Hence, silicon content is limited between 6.0 and 15.0 percent.

Manganese increases strength by forming a solid solution in the nickel matrix. Manganese content is limited between 0.1 and 2.0 percent because the strengthening effect is unobtainable when the content is below 0.1 percent and excessive strengthening and impairment of bond toughness occur over 2 percent.

Chromium is an extremely important element that enhances the corrosion and oxidation resistance of steels and alloys used in high-temperature environments and increases the hardenability of steels. For the bonded joint to acquire sufficient corrosion resistance and harden-ability, chromium content of at least 0.50 percent is necessary. Chromium addition in excess of 30.0 percent markedly raises the melting point of alloy foils, impairs workability, and raises the liquid-phase diffusion bonding temperature to above 1400° C. that is beyond the practical limit. Therefore, chromium content is limited between 0.50 and 30.0 percent.

Like chromium, molybdenum is also essential for the improvement of the corrosion resistance of bonded joints. Molybdenum is particularly effective in increasing resistance to stress corrosion cracking. Molybdenum also increases the desirable effect of the alloy foils according to this invention as it increases the creep strength of bonded joints at high temperatures by solid solution strengthening. Molybdenum addition under 0.10 percent does not produce the desired effect, whereas molybdenum, in conjunction with phosphorus which is the diffusing element in the alloy foils of this invention, precipitate $MO_2CrP_2$ type high-melting point phosphides at grain boundaries. Thus, molybdenum content is limited between 0.10 and 5.0 percent.

Vanadium increases the wettability between chromium-bearing alloys and the molten inserted metal by melting and spheroidizing the chromium oxide film at the surface thereof, thus preventing the chromium oxide film from inhibiting the diffusion of phosphorus. As such, vanadium is extremely important for the achievement of liquid-phase diffusion bonding in oxidizing atmospheres. Vanadium addition under 0.50 percent is insufficient for the melting of chromium oxide film to take place, whereas addition in excess of 10.0 percent raises the melting point of the inserted metal to above 1300° C. and, thus, makes it practically impossible to achieve liquid-phase diffusion bonding. Hence, vanadium content is limited between 0.50 and 10.0 percent.

Niobium forming fine precipitates in the matrix as carbides, nitrides or carbonitrides is particularly effective in increasing the high-temperature creep strength of bonded joints. Addition under 0.02 percent produces little effect because niobium is lost as oxides when the surface of the bonded material is oxidized. When added in excess of 1.0 percent, niobium causes intercrystalline segregation and embrittles bonded joints. Therefore, niobium content is limited between 0.02 and 1.0 percent.

Tungsten markedly increases the high-temperature creep strength of bonded materials by solid-solution strengthening. Thus, tungsten is indispensable for balancing the mechanical properties of recently developed heat-resisting materials having high creep strength and bonded joints. While addition under 0.10 percent produces no desired effect, addition in excess of 5.0 percent lowers the high-temperature strength by precipitating coarse Laves phases as a result of interdendritic segregation. Accordingly, tungsten content is limited between 0.10 and 5.0 percent.

Nitrogen greatly increases high-temperature strength by forming fine precipitates of carbides, nitrides or carbonitrides in the matrix, in conjunction with vanadium. Nitrogen addition of 0.05 percent or above produces a marked effect in changing precipitates into finely dispersed nitrides and improving corrosion resistance. However, nitrogen addition in excess of 2.0 percent causes precipitation of coarse nitrides that impairs the toughness of bonded joints. Thus, nitrogen content is limited between 0.05 and 2.0 percent.

Phosphorus is a diffusing element necessary for the attainment of isothermal solidification that is, in turn, necessary for the achievement of liquid-phase diffusing bonding. Phosphorous is also necessary for lowering the melting point of nickel matrix to below that of the bonded material. To achieve the above objects, a minimum of 0.50 percent phosphorous should be added. However, the inventors found that phosphorous forms coarse phosphides larger than 5 μm at grain boundaries of molybdenum- and chromium-bearing alloys near the bonded joint, thereby greatly lowering the strength of the bonded joint, when added in excess of 20.0 percent. Hence, phosphorous content is limited between 0.50 and 20.0 percent. The low phosphorus content is one of the characteristic features of this invention.

When liquid-phase diffusion bonding alloy foils containing boron as the main diffusing element is used for bonding metals containing large quantities of nitrogen, boron and nitrogen form coarse boron nitrides, thereby causing a lowering of joint strength. The selection of phosphorus as the main diffusing element avoids the formation of boron nitrides and provides sound defect-free joints. This is one of the reasons why phosphorus is chosen as the main diffusing element.

In addition to the basic constituents described above, the alloy foils according to this invention may also contain one or two elements selected from (A) 0.005 to 1.0 percent carbon and/or (B) 0.01 to 5.0 percent titanium, and 0.01 to 5.0 percent zirconium.

Carbon forms carbides. More specifically, carbon forms stable carbides in conjunction with niobium, vanadium, tungsten, molybdenum, chromium, titanium, zirconium and some other elements. When proper heat treatment is applied, carbon is finely dispersed in steel, thereby increasing the creep rupture strength of bonded joints. At the same time, carbon increases the strength of metallic materials as interstitial atoms therein that form interstitial solid solutions. Therefore, carbon effectively balances the mechanical properties of bonded joints to those of the high-strength materials to be bonded together. Under 0.005 percent, however, carbon does not exhibit sufficient strength increasing effect. On the other hand, carbon addition in excess of 1.0 percent coarsens carbides to such an extent as to inhibit the enhancement of creep strength. Therefore, carbon content is limited between 0.005 and 1.0 percent.

The relationship between carbon and nitrogen is so important that the ratio in mass percent therebetween should always be kept less than 1. The precipitates in the bonded joints can exist as nitrides or carbonitrides primarily consisting of chromium, molybdenum, niobium or vanadium and the excellent corrosion resistance and high-temperature strength characteristic of the high-nitrogen materials specified in claims 1 to 4 are obtainable only when the above relationship is established.

Titanium and zirconium trap and fix oxygen atoms infiltrating into the metal at the bonded joint when liquid-phase diffusion bonding is done in oxidizing atmospheres, thus forming titanium oxides ($Ti_xO_y$) and zirconium oxide ($ZrO_2$). Removed as slag during upsetting, titanium and zirconium oxides have an effect to clean the bonded joint. When added in larger quantities, titanium combines with carbon to form fine precipitates of carbides, thus increasing the high-temperature creep strength of bonded joints. Addition under 0.01 percent does not produce the desired effect, whereas addition in excess of 5.0 percent causes segregation along grain boundaries that markedly embrittles bonded joints. Therefore, titanium and zirconium contents are limited between 0.01 and 5.0 percent. The alloying elements described above may be added either singly or in combination.

The vitreous crystalline structure of alloy foils according to this invention assures uniform melting required for the achievement of satisfactory liquid-phase diffusion bonding. If alloy foil has a nonuniform structure with segregation of alloying elements, homogeneous bond interface is unobtainable because the melting point of the inserted metal varies from point to point. If homogeneous structure and alloy foil are readily obtainable, the crystalline structure need not be vitreous.

The alloy foils for liquid-phase diffusion bonding according to this invention can be provided in various forms of inserted metal. For example, it is not only entirely possible but also most appropriate to form alloys having the compositions specified in claims (1) to (4) into foils by quenching.

There are several variations of liquid quenching that is basically accomplished by projecting molten alloy through a nozzle onto a cooled plate that cools and solidifies the molten alloy by thermal contact. Of these variations, a process known as the single-roll process is well suited. Centrifugal quenching using the inner wall of a drum, a process employing an endless belt and their improvements, such as those including an auxiliary roll or a roll surface temperature control unit, or casting under reduced pressure, in vacuum or in inert gases are also applicable. A dual roll process achieves quenching and solidification by pouring molten alloy between paired rolls.

The alloy foils according to this invention can also be prepared by combining vacuum melting, casting, ordinary rolling and annealing.

Thinner alloy foils are better suited for liquid-phase diffusion annealing because mechanical properties vary less near the bonded joint and bonding is accomplished in shorter time. When the thickness is under 3 μm, however, the absolute quantity of vanadium is insufficient for making harmless the chromium oxide film at the surface of the bonded metal. When the thickness exceeds 300.0 μm, on the other hand, more than 10 hours are required to complete liquid-phase diffusion bonding. Therefore, foil thickness is limited between 3.0 and 300.0 μm.

This invention relates to alloy foils for liquid-phase diffusion bonding. Because bonding can be carried out in the atmosphere, the alloy foils according to this invention can also be used for brazing, soldering and other metal joining processes.

EXAMPLE

Table 1 (1-1 to 1-4) shows specimens of approximately 100 g of alloys having the compositions specified in claims 1 to 4 which were formed into 2 to 215 mm wide and 50.0 μm thick foils by (1) quenching by the single roll process using a copper alloy roll with a diameter of 300 mm) or (2) hot rolling by a conventional method alloys melted in a vacuum melting furnace and cast. The foils hot-rolled by the method (2) were subjected to homogenizing annealing at 700° C. for 10 hours to eliminate macroscopic compositional inhomogeneities. The foils quenched by the method (1) were cast by maintaining the peripheral roll speed between 5.0 and 15.0 m per second. The methods employed are shown in Table 1. The methods (1) and (2) are respectively designated by 1 and 2 in the column headed "Method". The width and thickness of the obtained foils were checked at five points. Table 1 also shows the melting points determined by means of a differential thermoanalyzer (DTA).

Table 1 shows the chemical compositions of alloy foils in mass percent determined by chemical analysis. All alloy foils have nickel-base matrices. The balance between 100 percent and the total percentage of other components is the total content of nickel and inherent impurities. The foils prepared under the conditions described before have amorphous, crystalline and partially amorphous and crystalline structures. The type of crystal structures depend upon the chemical composition of alloy foils.

Table 2 shows the chemical compositions and other properties of alloy foils prepared for the purpose of comparison with the alloy foils of this invention.

Liquid-phase diffusion bonding was carried out using the inserted metals satisfying the requirements specified in claims 1 to 5, listed in Table 1, and the other inserted metals prepared for the purpose of comparison, including those of the conventional types, listed in Table 2, totaling one hundred in number.

All alloy foils listed in Table 2 have nickel-base matrices. The balance between 100 percent and the total percentage of other components is the total content of nickel and inherent impurities. The alloy foils in Table 2 were also prepared by the same methods as those used in the preparation of the alloy foils according to this invention listed in Table 1.

Figure 1:
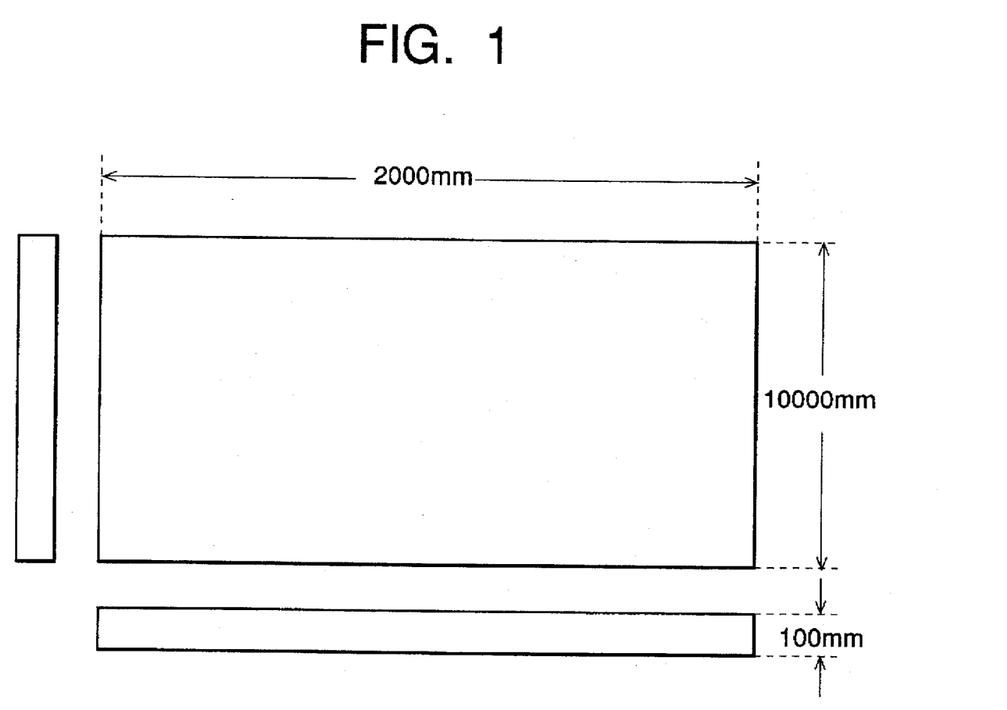
FIG. 1 is a schematic illustration showing an example of a bonded product.
Figure 2:
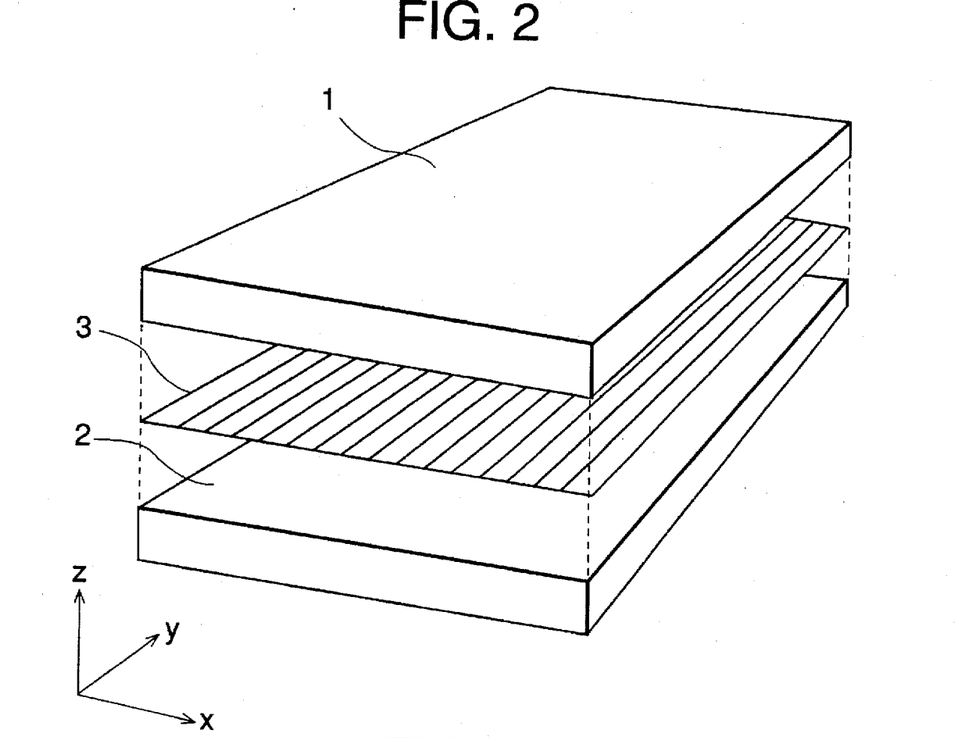
FIG. 2 shows how a liquid-phase diffusion bonded clad sheet steel is made.
Figure 3:
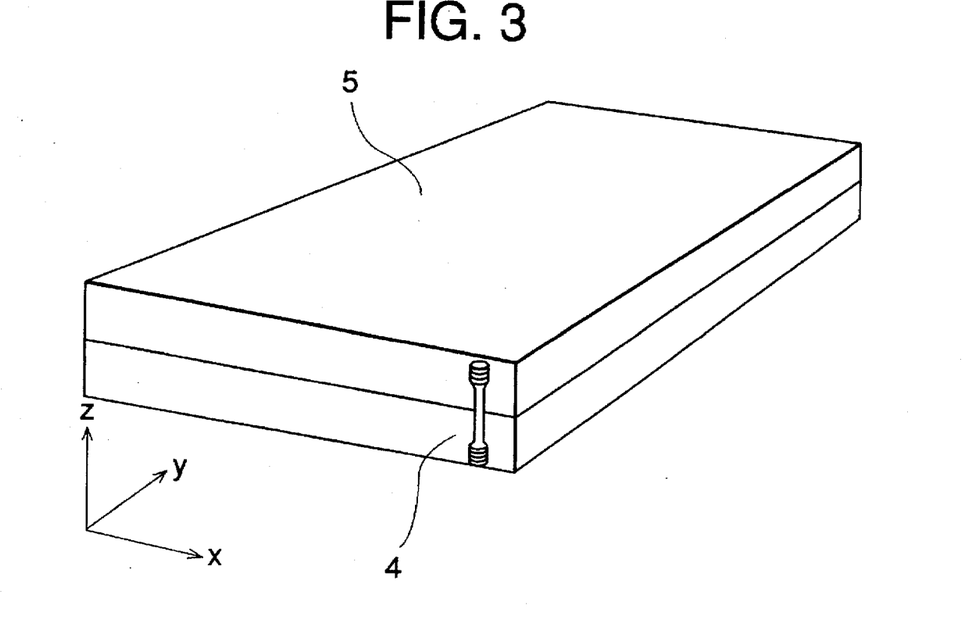
FIG. 3 shows a completed clad sheet steel and how a tensile specimen for evaluating the fracture strength of the bonded joint.

The test specimens of chromium-bearing ferritic and austenitic heat-resisting steels and 62 percent nickel-base high heat-resisting steel, measuring 100 by 1000 by 2000 mm, in thickness, width and length, as shown in FIG. 1. An inserted metal 3 was placed between two plates as shown in FIG. 2. Reference numerals 1 and 2 in FIG. 2 designate the metals (carbon and alloy steels) joined together, whereas reference numeral 3 denote the alloy foil (inserted metal) for liquid-phase diffusion bonding. Table 3 lists the chemical compositions of the metals joined together by liquid-phase diffusion bonding. The thickness of the inserted metal was 3.0 to 500 μm. Bonding was effected in the atmosphere using a large heating furnace at 1050° to 1300° C. which were between just above the melting points of the alloy foils and the melting point plus 50° C. Bonding was carried out under gravity, without applying any extra pressure, and in one hour. To secure the strength, corrosion resistance and toughness of the bonded metals, annealing, combinations of hardening and annealing, annealing and tempering, and hardening and annealing and tempering were applied singly and in combination. During these heat treatments, interdiffusion of elements between the bonded metals proceeded to achieve the homogenization of the bonded joints. Because of the low phosphorus contents in the inserted metals, however, hardly any formation, increase or growth of precipitates occurred.

Next, the soundness of the bonded joints was checked by the method according to JIS G 0601-5, "Method of Ultrasonic Flaw Detection for Clad Steel Sheets". In all specimens with the inserted metals satisfying the requirements of claims 1 to 5, the bonded area ratio was 0 percent.

Then, the tensile test specimens of JIS A-2 type with the axis extending in the direction of thickness were taken to determine the relative fracture strength of the bonded joint at room temperature using an Instron tension tester.

Tensile fracture strength of bonded joints depend upon the properties and thickness of the bonded metals, service environments, and other factors. For the purpose of the test, 40 kg/mm$^2$ was assumed to be a minimum necessary strength. The bonded joints whose fracture strength exceeded 40 kg/mm$^2$ were considered to be satisfactory. Test results are also shown in Table 1.

Figure 4:
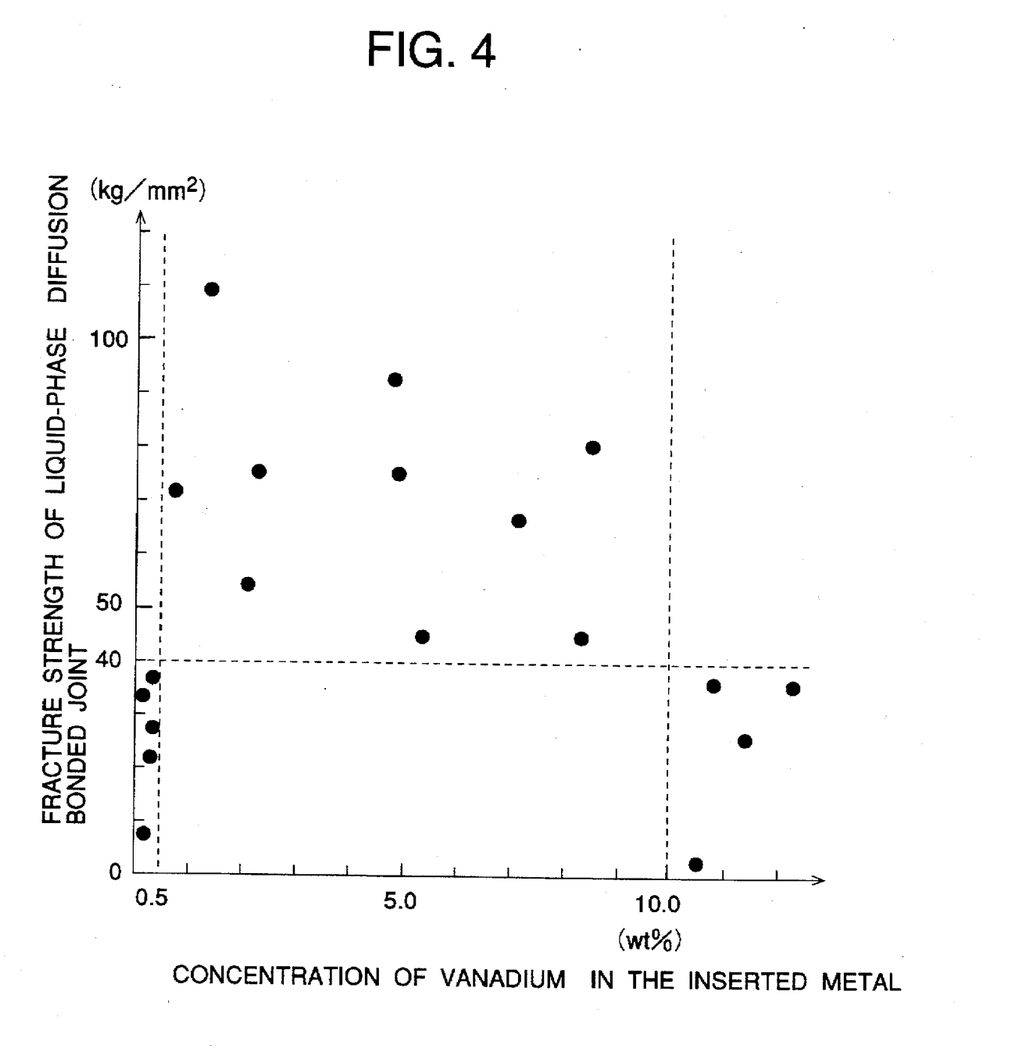
FIG. 4 shows the relationship between the concentration of vanadium in the inserted metal and the fracture strength of the bonded joint.

FIG. 4 shows the influence of the concentration of vanadium in the inserted metal on the fracture strength of the bonded joint. When the vanadium content was under 0.5 mass percent, the fracture strength of the bonded joint was low because the detrimental effect of the chromium oxide film at the surface of the bonded metal was not sufficiently removed. Vanadium content of 0.5 percent or above proved to make the fracture strength of the bonded joint equal to or above the level of the bonded metal and effectively remove the detrimental effect of the chromium oxide film. Vanadium content in excess of 10.0 percent, however, proved to raise the melting point of the inserted metal, thereby shortening the time required for bonding and lowering the fracture strength of the bonded joint.

Figure 5:
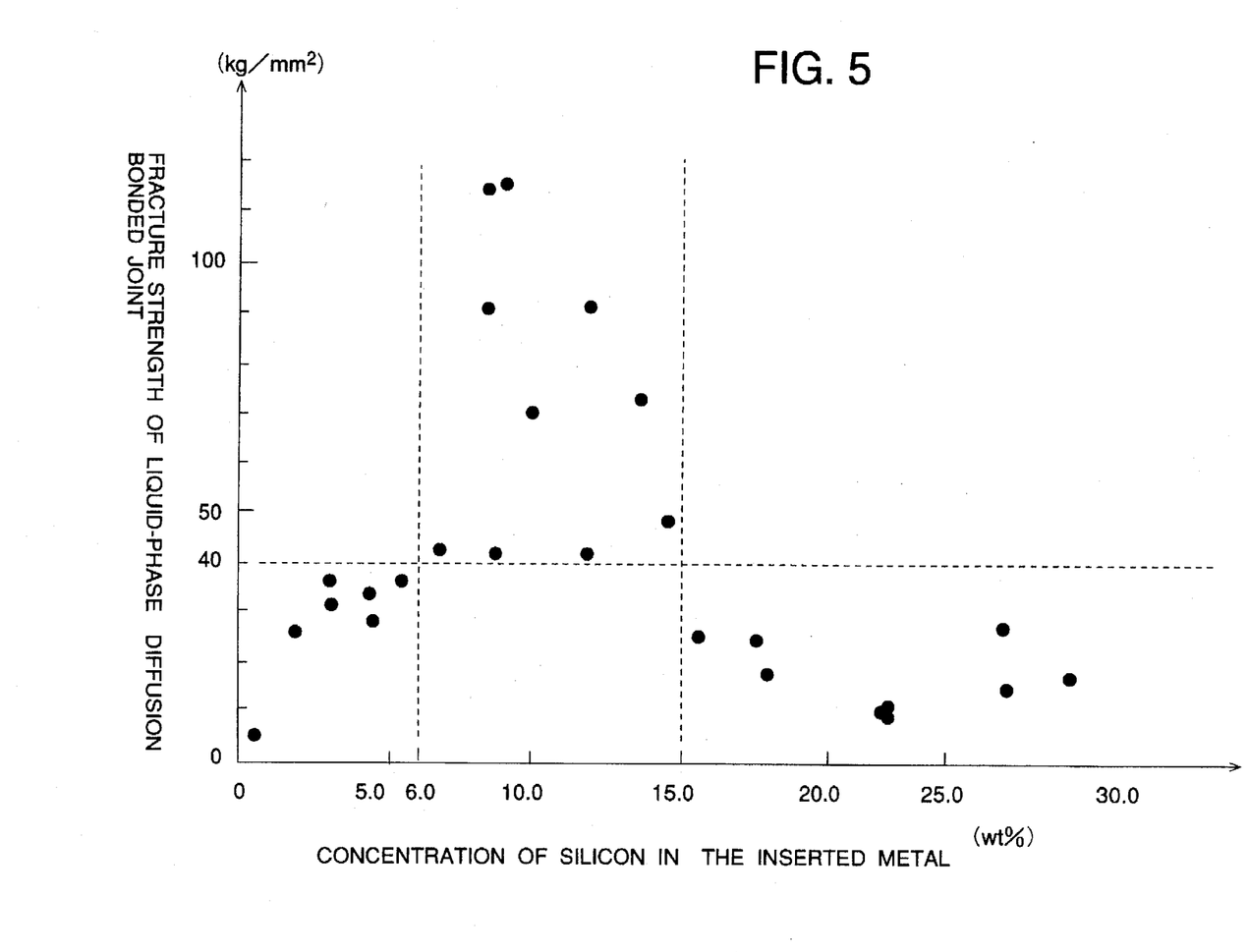
FIG. 5 shows the relationship between the concentration of silicon in the inserted metal and the fracture strength of the bonded joint.

FIG. 5 similarly shows the relationship between silicon content and the fracture strength of bonded joints. The fracture strength of bonded joints was low when silicon content was under 6.0 percent and in excess of 15.0 percent, whereas high fracture strength was obtained between 6.0 and 15.0 percent.

Figure 6:
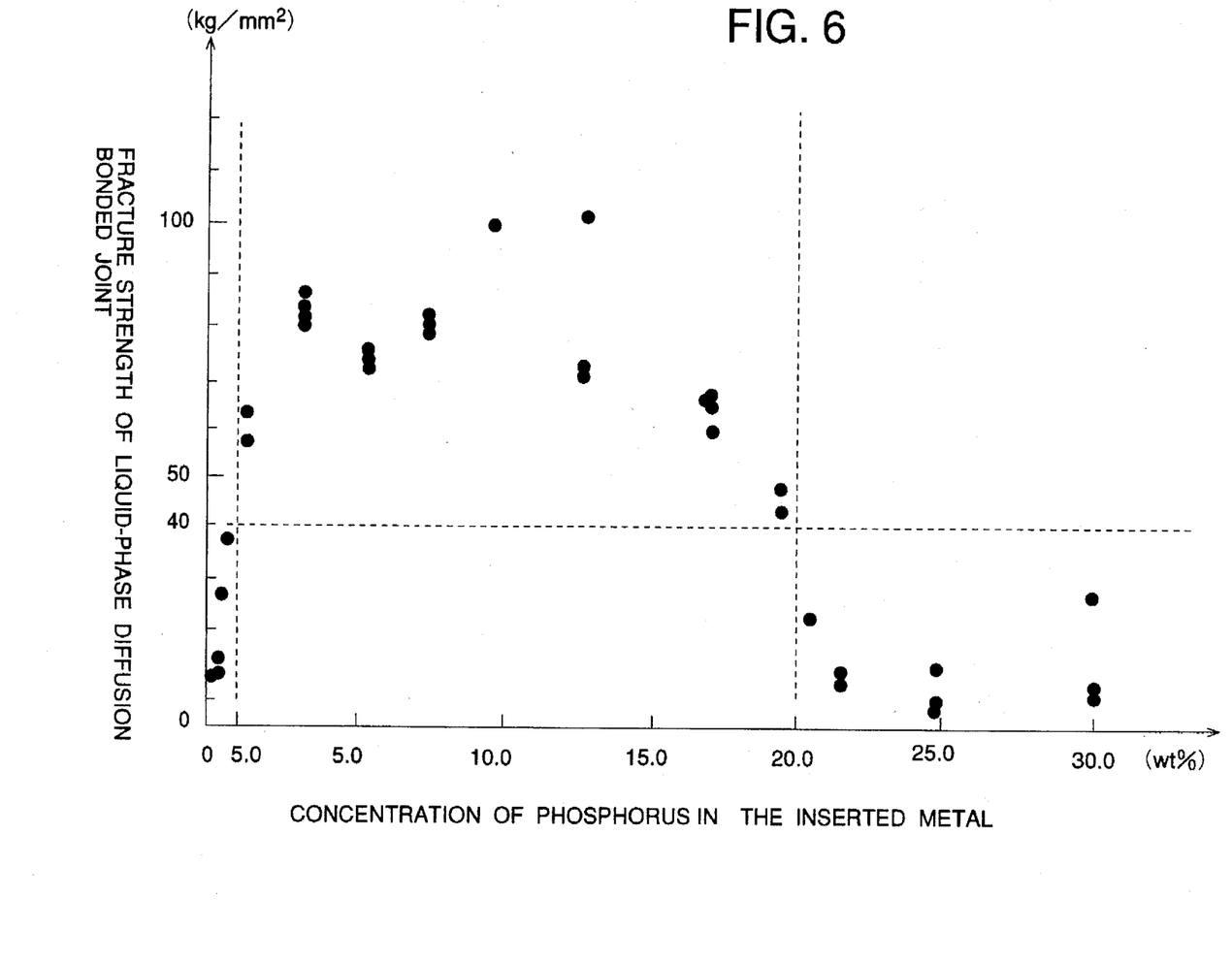
FIG. 6 shows the relationship between the concentration of phosphorus and the fracture strength of the bonded joint.

FIG. 6 shows the relationship between phosphorus content and the fracture strength of bonded joints. The fracture strength of bonded joints lowered when phosphorus content was under 0.5 percent because of the rise in the melting point and over 20.0 percent because of the phosphides formed near the bonding interface. High fracture strength was obtained with boron contents between 0.5 and 20.0 percent.

Figure 7:
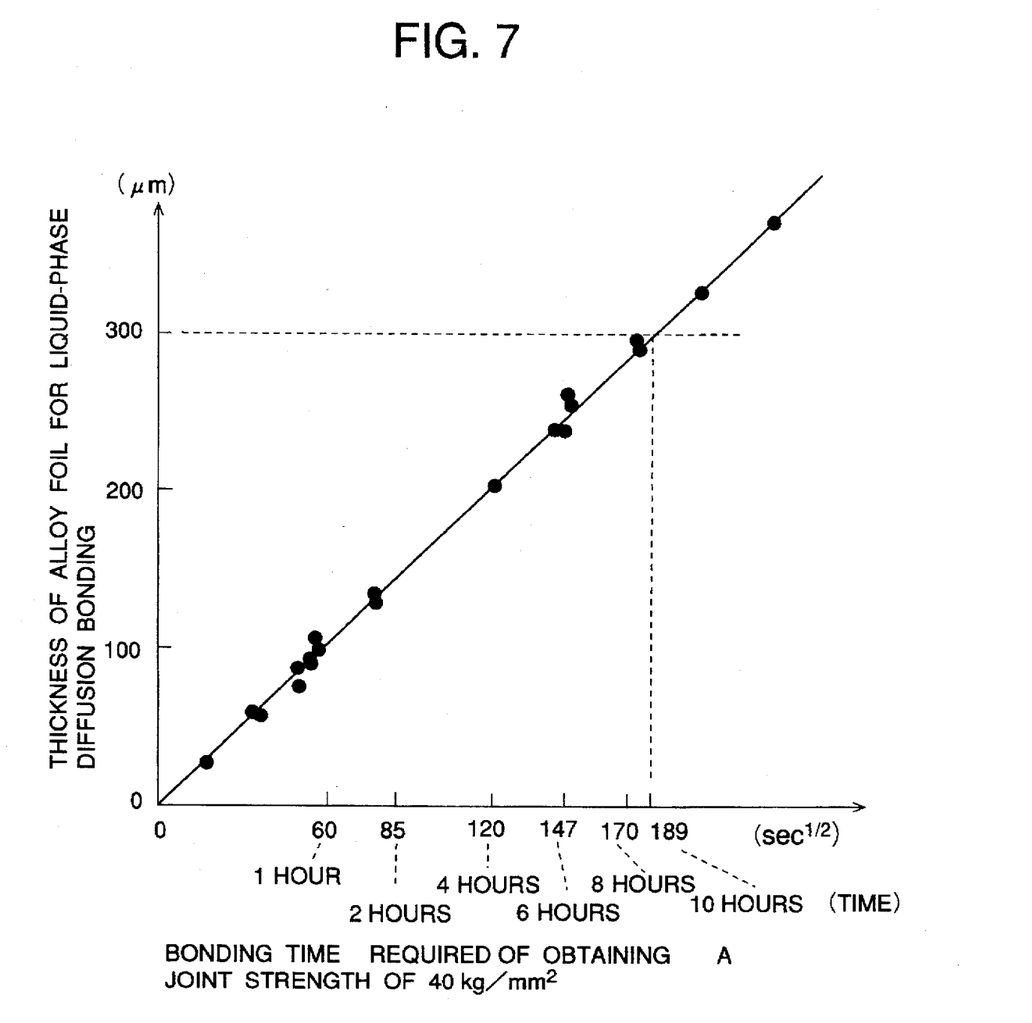
FIG. 7 shows the influence of the thickness of the inserted metal on the time required for obtaining a bonded joint having a fracture strength of 40 kg/mm² or above by liquid-phase diffusion bonding.
Figure 8:
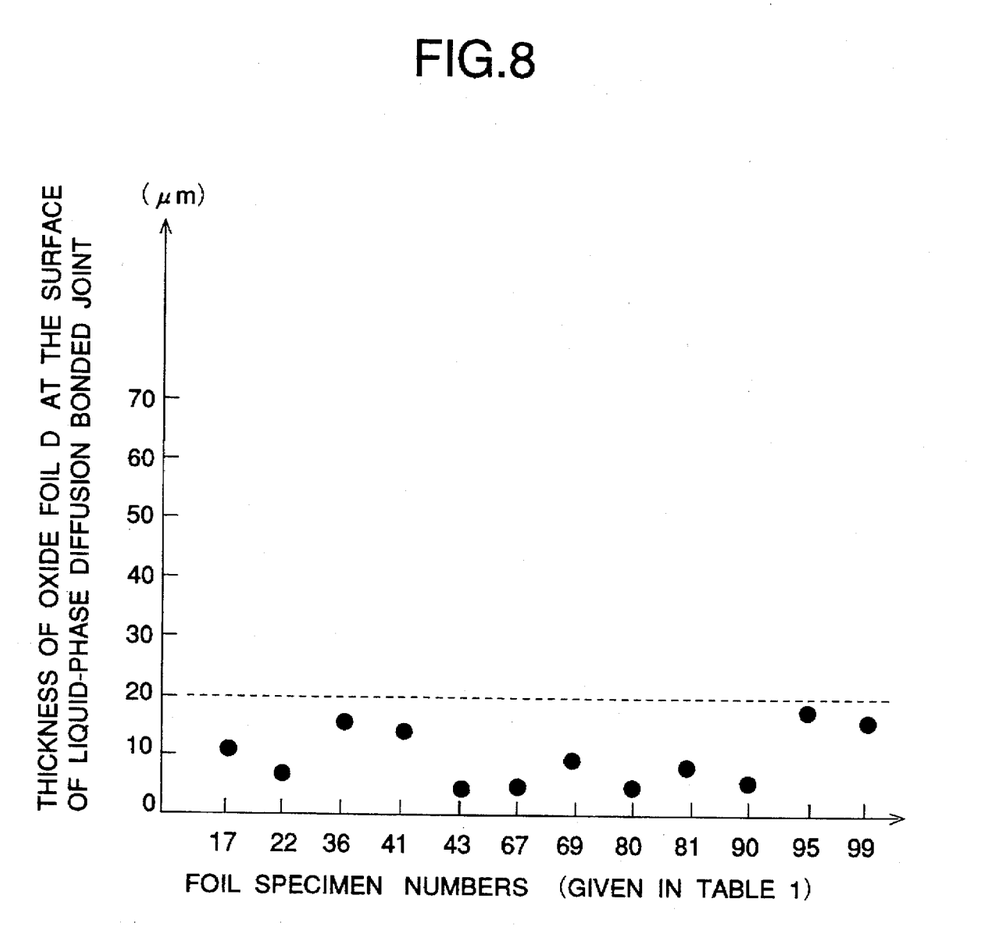
FIG. 8 shows the thickness D of the oxide film formed by heating at 700° C. for 1000 hours that serves as an index of the resistance of the alloys according to this invention to oxidation at high temperatures.

FIG. 7 shows the relationship between the thickness of the inserted metal and the bonding time required for obtaining a bonded joint having a tensile strength of not lower than 40 kg/mm$^2$. The alloy foils according to this invention proved to require impractically long bonding times of over 10 hours when thickness exceeds 300 μm.

Table 2 shows the chemical compositions and melting points of the alloy foils prepared for the purpose of comparison with those according to this invention, tensile fracture strengths of the bonded joints of the clad steels prepared by the same method as that used with the preferred embodiment of this invention, and the thickness D of the oxide films formed at the surface of the bonded joints when oxidized in the atmosphere by heating at 700° C. for 1000 hours as an index of oxidation resistance. With the oxidation resistance of ferritic heat-resisting steels used at 500° to 650° C. in mind, the threshold value of the thickness D was set at 20 μm. Bonded joints are considered to maintain adequate oxidation resistance at high temperatures for a long time if D is 20 μm or under. The thickness D of all of the alloy foils according to this invention satisfying the requirements of claims 1 to 5 listed in Table 1 was not greater than 20 μm.

Among the alloy foils prepared for the purpose of comparison, Foil No. 101 exhibited a low fracture strength because of an insufficient phosphorus content and a melting point above 1300° C. Foil No. 102 exhibited a markedly low fracture strength because of a high phosphorus content and large quantities of coarse phosphates formed in the bonded metals near the bonded joint. Foils Nos. 103 and 104 exhibited low fracture strengths because of an insufficient silicon content, with a melting point exceeding 1300° C., and because of an excessive silicon content, with coarse silicon oxide-base oxides formed in the inserted metal. Foil No. 105 had a detrimental chromium oxide film formed at the surface of the bonded metal due to vanadium deficiency. Foil No. 106 failed to produce thorough liquid-phase diffusion bonding because of a vanadium content exceeding 10.0 percent and an extremely high melting point. Foil No. 107 exhibited a poor oxidation resistance due to chromium deficiency. Foil No. 108 exhibited a poor oxidation resistance due to molybdenum deficiency. Foils Nos. 109 and 110 exhibited insufficient bonded joint strengths due to niobium and tungsten deficiencies. Foil No. 111 exhibited an insufficient bond strength due to an excess of tungsten and a melting point exceeding 1300° C. Foil No. 112 exhibited a poor bond strength due to insufficient precipitation strengthening because the ratio of carbon to nitrogen was over 1 and the nitrogen content was below the lower limit specified in claims 1 to 4.

TABLE 1

Foils of This Invention-Chemical Compositions (in mass percent)

| No. | Si | Mn | Cr | Mo | V | Nb | W | N | P | C | Ti | Zr | MP | RS | TH | METHOD |
|---|---|---|---|---|---|---|---|---|---|---|---|---|---|---|---|---|
| 1 | 6.10 | 0.40 | 13.88 | 1.50 | 4.377 | 0.952 | 4.61 | 0.443 | 11.181 | — | — | — | 980 | 63.6 | 93 | 1 |
| 2 | 13.58 | 1.39 | 11.09 | 0.17 | 6.708 | 0.173 | 1.47 | 1.322 | 6.132 | — | — | — | 968 | 66.7 | 36 | 2 |
| 3 | 12.65 | 1.89 | 5.98 | 4.26 | 7.027 | 0.346 | 1.54 | 1.903 | 11.428 | — | — | — | 919 | 72.2 | 195 | 2 |
| 4 | 6.38 | 1.62 | 9.03 | 3.25 | 8.712 | 0.351 | 1.66 | 1.881 | 4.521 | — | — | — | 1036 | 69.8 | 117 | 2 |
| 5 | 6.70 | 1.19 | 15.17 | 1.20 | 0.630 | 0.998 | 0.99 | 0.928 | 11.387 | — | — | — | 943 | 64.4 | 236 | 2 |
| 6 | 12.23 | 0.31 | 4.80 | 4.64 | 9.685 | 0.648 | 1.15 | 1.627 | 9.097 | — | — | — | 949 | 64.4 | 105 | 2 |
| 7 | 12.33 | 0.53 | 2.25 | 0.52 | 1.069 | 0.623 | 1.37 | 0.778 | 4.659 | — | — | — | 918 | 60.0 | 161 | 1 |
| 8 | 10.28 | 1.59 | 18.23 | 2.78 | 6.584 | 0.759 | 3.28 | 0.948 | 13.917 | — | — | — | 964 | 71.2 | 100 | 2 |
| 9 | 13.32 | 1.23 | 17.48 | 0.76 | 5.524 | 0.890 | 3.65 | 0.865 | 14.630 | — | — | — | 924 | 69.2 | 211 | 2 |
| 10 | 11.22 | 0.13 | 25.46 | 1.06 | 1.228 | 0.376 | 1.68 | 0.209 | 3.368 | — | — | — | 1057 | 59.1 | 192 | 2 |
| 11 | 11.40 | 0.82 | 7.49 | 0.39 | 1.526 | 0.521 | 3.90 | 0.603 | 6.183 | — | — | — | 948 | 63.8 | 34 | 1 |
| 12 | 7.88 | 0.11 | 17.62 | 0.42 | 9.684 | 0.673 | 2.16 | 0.744 | 19.800 | — | — | — | 912 | 61.0 | 178 | 2 |
| 13 | 8.16 | 0.56 | 6.98 | 2.78 | 5.070 | 0.666 | 2.95 | 1.295 | 2.905 | — | — | — | 1027 | 64.4 | 19 | 1 |
| 14 | 6.24 | 0.90 | 29.39 | 4.18 | 9.911 | 0.342 | 0.64 | 0.961 | 18.120 | — | — | — | 1008 | 66.0 | 149 | 1 |
| 15 | 9.73 | 0.83 | 6.49 | 1.41 | 8.362 | 0.522 | 1.74 | 0.390 | 6.098 | — | — | — | 980 | 62.7 | 20 | 2 |

TABLE 1-continued

Foils of This Invention-Chemical Compositions (in mass percent)

| No. | Si | Mn | Cr | Mo | V | Nb | W | N | P | C | Ti | Zr | MP | RS | TH | METHOD |
|---|---|---|---|---|---|---|---|---|---|---|---|---|---|---|---|---|
| 16 | 8.09 | 1.92 | 21.95 | 3.45 | 8.401 | 0.559 | 0.57 | 1.226 | 1.984 | — | — | — | 1112 | 70.9 | 51 | 2 |
| 17 | 8.93 | 1.03 | 12.14 | 4.65 | 8.544 | 0.293 | 1.24 | 1.199 | 2.577 | — | — | — | 1062 | 66.4 | 106 | 2 |
| 18 | 6.21 | 0.69 | 16.37 | 4.19 | 2.446 | 0.544 | 2.92 | 0.958 | 4.602 | — | — | — | 1053 | 64.8 | 125 | 2 |
| 19 | 11.96 | 1.53 | 29.45 | 3.63 | 7.436 | 0.644 | 2.33 | 0.175 | 14.535 | — | — | — | 1009 | 70.3 | 96 | 2 |
| 20 | 11.16 | 1.36 | 17.39 | 4.71 | 3.068 | 0.943 | 3.62 | 0.495 | 9.828 | — | — | — | 990 | 70.2 | 14 | 1 |
| 21 | 11.38 | 0.78 | 4.50 | 4.09 | 6.671 | 0.777 | 1.04 | 1.575 | 16.303 | — | — | — | 862 | 65.7 | 171 | 1 |
| 22 | 6.60 | 1.40 | 1.03 | 1.02 | 7.260 | 0.967 | 3.58 | 1.168 | 1.740 | — | — | — | 1014 | 68.3 | 264 | 1 |
| 23 | 13.41 | 1.02 | 16.79 | 4.53 | 3.353 | 0.383 | 3.15 | 0.897 | 11.613 | — | — | — | 956 | 68.1 | 133 | 2 |
| 24 | 12.34 | 1.23 | 2.79 | 3.98 | 2.814 | 0.813 | 1.34 | 0.449 | 13.549 | — | — | — | 857 | 65.3 | 69 | 2 |
| 25 | 10.88 | 0.74 | 13.09 | 1.02 | 8.837 | 0.633 | 4.71 | 1.439 | 4.197 | — | — | — | 1042 | 68.3 | 67 | 2 |
| 26 | 12.01 | 1.16 | 27.97 | 4.61 | 5.576 | 0.659 | 0.26 | 0.637 | 9.760 | — | — | — | 1034 | 67.3 | 269 | 1 |
| 27 | 9.83 | 1.22 | 28.08 | 1.76 | 5.795 | 0.241 | 4.24 | 0.642 | 7.462 | — | — | — | 1076 | 68.9 | 223 | 2 |
| 28 | 11.83 | 1.57 | 8.35 | 1.40 | 7.363 | 0.189 | 1.19 | 1.117 | 13.376 | — | — | — | 901 | 67.1 | 216 | 1 |
| 29 | 7.42 | 0.91 | 22.93 | 2.75 | 0.720 | 0.354 | 2.55 | 0.799 | 15.086 | — | — | — | 957 | 64.7 | 241 | 1 |
| 30 | 8.87 | 0.89 | 23.09 | 0.15 | 6.670 | 0.577 | 2.66 | 0.327 | 18.761 | — | — | — | 931 | 64.4 | 146 | 2 |
| 31 | 10.04 | 1.16 | 18.61 | 2.57 | 9.866 | 0.695 | 0.69 | 1.339 | 11.605 | 0.973 | — | — | 973 | 68.6 | 219 | 2 |
| 32 | 9.48 | 0.45 | 18.96 | 1.80 | 3.852 | 0.043 | 3.11 | 0.559 | 19.364 | 0.245 | — | — | 885 | 62.6 | 158 | 2 |
| 33 | 14.68 | 1.32 | 5.22 | 4.49 | 1.504 | 0.439 | 1.88 | 1.606 | 9.969 | 0.060 | — | — | 891 | 68.6 | 99 | 1 |
| 34 | 10.69 | 1.55 | 1.49 | 2.39 | 1.191 | 0.735 | 1.05 | 0.244 | 19.069 | 0.138 | — | — | 784 | 64.6 | 189 | 2 |
| 35 | 14.12 | 0.83 | 3.25 | 2.11 | 1.352 | 0.769 | 4.69 | 1.021 | 4.312 | 0.671 | — | — | 930 | 67.6 | 271 | 2 |
| 36 | 9.76 | 1.67 | 19.87 | 2.74 | 4.995 | 0.363 | 4.60 | 1.645 | 11.173 | 0.495 | — | — | 991 | 73.8 | 189 | 2 |
| 37 | 9.70 | 1.88 | 2.59 | 3.54 | 5.995 | 0.354 | 2.49 | 0.842 | 17.106 | 0.463 | — | — | 844 | 69.9 | 232 | 1 |
| 38 | 8.11 | 1.16 | 20.65 | 3.74 | 2.869 | 0.590 | 2.53 | 1.265 | 9.693 | 0.421 | — | — | 1003 | 68.6 | 246 | 2 |
| 39 | 9.06 | 1.11 | 10.24 | 2.60 | 8.345 | 0.909 | 3.86 | 0.604 | 14.453 | 0.197 | — | — | 936 | 68.2 | 76 | 2 |
| 40 | 12.47 | 1.40 | 10.52 | 1.66 | 1.717 | 0.166 | 3.23 | 1.473 | 8.839 | 0.617 | — | — | 923 | 68.8 | 162 | 2 |
| 41 | 6.43 | 0.78 | 2.01 | 0.17 | 9.999 | 0.154 | 4.71 | 1.586 | 8.999 | — | 3.057 | — | 978 | 66.3 | 197 | 2 |
| 42 | 10.83 | 1.77 | 23.91 | 4.62 | 7.808 | 0.230 | 0.17 | 1.614 | 2.136 | — | 1.901 | — | 1117 | 71.5 | 176 | 2 |
| 43 | 10.79 | 0.27 | 27.46 | 4.48 | 7.949 | 0.232 | 3.52 | 1.237 | 4.552 | — | 3.825 | — | 1137 | 67.3 | 89 | 1 |
| 44 | 13.84 | 1.66 | 7.60 | 3.80 | 8.787 | 0.976 | 1.65 | 1.087 | 12.817 | — | 3.487 | — | 929 | 72.0 | 230 | 2 |
| 45 | 9.39 | 0.88 | 18.14 | 4.17 | 8.654 | 0.819 | 3.57 | 0.867 | 14.137 | — | 0.536 | — | 987 | 69.0 | 144 | 2 |
| 46 | 9.54 | 0.46 | 10.56 | 4.87 | 1.425 | 0.601 | 1.16 | 1.216 | 15.060 | — | 4.699 | — | 915 | 63.7 | 122 | 2 |
| 47 | 8.31 | 1.06 | 23.93 | 0.14 | 4.394 | 0.144 | 3.36 | 0.848 | 12.389 | — | 0.675 | — | 997 | 65.8 | 158 | 2 |
| 48 | 8.69 | 0.44 | 9.16 | 1.47 | 6.613 | 0.767 | 2.06 | 0.410 | 2.923 | — | 3.141 | — | 1040 | 61.9 | 91 | 2 |
| 49 | 13.82 | 0.22 | 6.01 | 3.15 | 1.738 | 0.354 | 1.38 | 1.555 | 12.790 | — | 4.262 | — | 886 | 62.4 | 69 | 2 |
| 50 | 13.13 | 1.96 | 24.04 | 4.37 | 2.496 | 0.700 | 0.49 | 1.998 | 19.215 | — | 1.269 | — | 906 | 73.7 | 233 | 2 |
| 51 | 9.63 | 1.57 | 14.28 | 4.32 | 7.217 | 0.163 | 0.99 | 0.428 | 9.095 | — | — | 0.695 | 998 | 67.1 | 275 | 1 |
| 52 | 6.36 | 0.63 | 16.25 | 2.19 | 9.704 | 0.557 | 4.59 | 0.449 | 8.710 | — | — | 1.979 | 1055 | 66.1 | 191 | 1 |
| 53 | 6.32 | 0.72 | 10.01 | 2.08 | 8.399 | 0.739 | 0.68 | 1.740 | 14.862 | — | — | 3.730 | 944 | 65.0 | 272 | 1 |
| 54 | 8.18 | 1.55 | 20.69 | 3.20 | 1.669 | 0.537 | 0.65 | 0.059 | 14.295 | — | — | 0.647 | 950 | 65.4 | 213 | 1 |
| 55 | 14.70 | 0.87 | 13.48 | 4.74 | 6.992 | 0.297 | 1.33 | 1.942 | 14.095 | — | — | 2.398 | 930 | 68.7 | 4 | 1 |
| 56 | 11.19 | 1.28 | 13.63 | 3.48 | 8.634 | 0.343 | 1.89 | 0.235 | 10.756 | — | — | 1.185 | 981 | 66.7 | 86 | 1 |
| 57 | 14.05 | 0.52 | 1.08 | 0.98 | 9.638 | 0.989 | 3.90 | 1.406 | 0.776 | — | — | 4.201 | 1021 | 67.5 | 9 | 2 |
| 58 | 12.64 | 0.16 | 29.88 | 3.85 | 3.733 | 0.130 | 1.73 | 1.288 | 10.737 | — | — | 3.610 | 1043 | 64.3 | 209 | 1 |
| 59 | 10.24 | 1.84 | 21.89 | 3.93 | 8.507 | 0.545 | 4.39 | 1.489 | 7.963 | — | — | 1.615 | 1071 | 75.9 | 84 | 2 |
| 60 | 9.73 | 0.47 | 16.08 | 2.83 | 3.181 | 0.105 | 1.22 | 1.673 | 8.602 | — | — | 2.895 | 996 | 63.3 | 224 | 1 |
| 61 | 9.67 | 0.49 | 8.04 | 4.70 | 5.380 | 0.128 | 3.71 | 0.576 | 19.510 | — | 2.867 | 2.147 | 891 | 64.7 | 26 | 1 |
| 62 | 13.12 | 1.60 | 7.48 | 1.37 | 8.723 | 0.935 | 3.67 | 0.788 | 8.084 | — | 0.783 | 4.049 | 984 | 71.9 | 225 | 2 |
| 63 | 14.07 | 1.59 | 24.30 | 4.27 | 6.900 | 0.907 | 0.36 | 1.020 | 10.202 | — | 3.006 | 3.319 | 1038 | 72.2 | 71 | 2 |
| 64 | 6.54 | 1.08 | 9.40 | 0.36 | 3.066 | 0.843 | 0.20 | 1.892 | 2.783 | — | 1.720 | 4.615 | 1036 | 65.4 | 6 | 2 |
| 65 | 11.48 | 0.69 | 16.61 | 1.01 | 5.163 | 0.599 | 2.52 | 0.210 | 2.662 | — | 4.098 | 0.141 | 1064 | 64.0 | 18 | 2 |
| 66 | 14.06 | 1.13 | 12.27 | 0.65 | 2.242 | 0.504 | 4.02 | 1.482 | 16.161 | — | 2.343 | 2.060 | 886 | 69.3 | 107 | 1 |
| 67 | 12.73 | 0.12 | 20.69 | 0.86 | 2.134 | 0.878 | 1.42 | 1.480 | 10.755 | — | 3.609 | 0.061 | 973 | 62.9 | 260 | 2 |
| 68 | 10.48 | 1.17 | 22.30 | 3.28 | 8.143 | 0.594 | 1.32 | 1.858 | 12.722 | — | 0.118 | 3.830 | 1015 | 70.5 | 177 | 1 |
| 69 | 10.44 | 0.19 | 12.36 | 4.69 | 9.134 | 0.461 | 2.88 | 0.330 | 18.635 | — | 4.053 | 3.097 | 943 | 64.3 | 294 | 2 |
| 70 | 11.02 | 1.59 | 0.56 | 1.77 | 3.438 | 0.799 | 0.35 | 1.428 | 5.796 | — | 2.607 | 2.518 | 943 | 67.6 | 11 | 2 |
| 71 | 10.75 | 1.26 | 11.54 | 3.55 | 8.682 | 0.975 | 2.78 | 0.964 | 10.080 | 0.749 | 2.935 | — | 978 | 71.1 | 62 | 2 |
| 72 | 8.19 | 1.74 | 10.99 | 4.31 | 8.909 | 0.324 | 2.02 | 0.559 | 18.538 | 0.266 | 4.743 | — | 923 | 70.4 | 145 | 2 |
| 73 | 10.83 | 1.77 | 23.77 | 3.31 | 7.460 | 0.166 | 2.13 | 0.860 | 8.396 | 0.019 | 0.255 | — | 1046 | 70.8 | 104 | 2 |
| 74 | 12.76 | 1.99 | 0.70 | 4.58 | 7.413 | 0.340 | 2.39 | 1.580 | 15.758 | 0.841 | 4.108 | — | 858 | 74.3 | 227 | 1 |
| 75 | 12.50 | 0.21 | 25.54 | 4.92 | 2.534 | 0.192 | 1.92 | 0.408 | 7.795 | 0.399 | 3.517 | — | 1040 | 63.5 | 64 | 2 |
| 76 | 13.04 | 1.79 | 19.59 | 3.48 | 5.441 | 0.046 | 4.82 | 0.942 | 0.884 | 0.538 | 0.665 | — | 1085 | 73.8 | 202 | 2 |
| 77 | 8.34 | 1.66 | 22.04 | 1.89 | 9.863 | 0.727 | 2.95 | 0.918 | 1.803 | 0.584 | 0.209 | — | 1113 | 72.0 | 38 | 1 |
| 78 | 10.52 | 1.44 | 13.62 | 4.30 | 9.490 | 0.604 | 2.85 | 0.976 | 16.952 | 0.054 | 4.333 | — | 950 | 71.6 | 162 | 2 |
| 79 | 9.14 | 1.76 | 19.13 | 2.57 | 2.801 | 0.988 | 3.74 | 1.787 | 13.880 | 0.262 | 2.785 | — | 965 | 74.5 | 121 | 2 |
| 80 | 7.09 | 1.33 | 3.64 | 3.15 | 7.164 | 0.733 | 4.79 | 1.065 | 8.737 | 0.057 | 2.736 | — | 983 | 70.4 | 202 | 1 |
| 81 | 11.96 | 1.78 | 7.15 | 0.43 | 6.843 | 0.174 | 2.76 | 1.431 | 8.454 | 0.278 | — | 4.400 | 958 | 70.7 | 104 | 1 |
| 82 | 13.34 | 0.88 | 9.94 | 3.40 | 4.994 | 0.128 | 4.20 | 0.600 | 9.452 | 0.246 | — | 1.319 | 953 | 66.9 | 117 | 2 |
| 83 | 9.58 | 1.14 | 6.60 | 3.79 | 9.446 | 0.912 | 3.34 | 1.176 | 18.356 | 0.809 | — | 4.261 | 890 | 71.2 | 232 | 2 |
| 84 | 8.34 | 0.39 | 7.84 | 0.95 | 4.651 | 0.431 | 1.96 | 0.921 | 12.697 | 0.309 | — | 0.536 | 905 | 60.9 | 293 | 2 |
| 85 | 12.65 | 1.15 | 23.13 | 1.34 | 3.077 | 0.953 | 1.58 | 0.451 | 8.622 | 0.153 | — | 2.268 | 996 | 67.3 | 148 | 2 |
| 86 | 7.50 | 1.23 | 3.70 | 4.20 | 3.277 | 0.858 | 1.48 | 0.444 | 2.933 | 0.434 | — | 1.680 | 996 | 65.6 | 235 | 1 |
| 87 | 9.41 | 0.29 | 18.02 | 1.33 | 8.331 | 0.953 | 3.20 | 1.524 | 1.875 | 0.220 | — | 3.430 | 1101 | 66.5 | 100 | 1 |
| 88 | 12.22 | 1.78 | 18.64 | 1.67 | 2.394 | 0.095 | 3.53 | 1.431 | 12.305 | 0.277 | — | 4.712 | 955 | 72.1 | 32 | 2 |
| 89 | 10.22 | 1.66 | 25.38 | 4.57 | 3.203 | 0.108 | 4.23 | 1.846 | 2.077 | 0.955 | — | 2.660 | 1109 | 75.4 | 175 | 2 |
| 90 | 6.44 | 1.51 | 24.07 | 4.25 | 8.977 | 0.822 | 1.96 | 0.454 | 6.611 | 0.222 | — | 4.565 | 1109 | 71.2 | 224 | 1 |

TABLE 1-continued

Foils of This Invention-Chemical Compositions (in mass percent)

| No. | Si | Mn | Cr | Mo | V | Nb | W | N | P | C | Ti | Zr | MP | RS | TH | METHOD |
|---|---|---|---|---|---|---|---|---|---|---|---|---|---|---|---|---|
| 91 | 8.25 | 1.95 | 7.87 | 4.81 | 8.696 | 0.596 | 3.25 | 0.843 | 13.035 | 0.065 | 0.586 | 2.570 | 948 | 74.1 | 24 | 2 |
| 92 | 9.81 | 1.73 | 1.56 | 3.01 | 0.799 | 0.255 | 4.86 | 0.744 | 18.149 | 0.177 | 1.447 | 3.830 | 827 | 71.3 | 161 | 1 |
| 93 | 9.53 | 1.46 | 29.46 | 0.44 | 2.693 | 0.124 | 1.07 | 0.810 | 9.004 | 0.606 | 4.743 | 0.587 | 1038 | 67.9 | 183 | 2 |
| 94 | 10.48 | 0.86 | 28.06 | 3.70 | 3.429 | 0.544 | 0.94 | 1.705 | 1.977 | 0.237 | 0.164 | 4.964 | 1129 | 68.5 | 82 | 2 |
| 95 | 11.17 | 1.50 | 7.28 | 4.65 | 6.124 | 0.851 | 3.59 | 0.169 | 3.467 | 0.118 | 2.348 | 4.215 | 1048 | 71.1 | 150 | 2 |
| 96 | 10.14 | 1.81 | 6.30 | 4.88 | 4.433 | 0.894 | 3.37 | 1.747 | 10.426 | 0.464 | 3.538 | 0.502 | 951 | 71.8 | 81 | 2 |
| 97 | 14.93 | 0.53 | 20.50 | 3.64 | 6.372 | 0.507 | 1.90 | 0.261 | 9.829 | 0.110 | 3.401 | 0.999 | 1009 | 65.2 | 19 | 2 |
| 98 | 6.00 | 1.14 | 15.33 | 4.98 | 0.807 | 0.503 | 3.24 | 1.226 | 17.824 | 0.878 | 4.122 | 2.879 | 931 | 70.1 | 251 | 2 |
| 99 | 13.42 | 0.79 | 15.43 | 3.19 | 5.143 | 0.237 | 4.17 | 1.413 | 2.115 | 0.119 | 0.378 | 3.374 | 1068 | 69.1 | 29 | 2 |
| 100 | 13.20 | 0.14 | 16.32 | 4.88 | 8.544 | 0.537 | 3.93 | 0.517 | 18.156 | 0.121 | 4.372 | 4.649 | 953 | 67.6 | 239 | 1 |

MP: Melting point of inserted metal (°C.)
RS: Tensile strength of liquid-phase diffusion bonded joint (kg/mm$^2$)
TH: Thickness of inserted metal (μm)
METHOD: Methods of preparing inserted metal
(1: quenching with single roll; 2: hot-rolling cast alloy prepared in vacuum melting furnace)

TABLE 2

| | | Chemical Composition (in mass percent) | | | | | | | | | | | Melting Point of Inserted Metal (°C.) | Tensile Strength of Bonded Joint (kg/mm$^2$) | Thickness of Oxide Film D (μm) |
|---|---|---|---|---|---|---|---|---|---|---|---|---|---|---|---|---|
| | | Si | Mn | Cr | Mo | V | Nb | W | N | P | C | Ti | Zr | | | |
| Alloy | 101 | 6.0 | 0.55 | 25.2 | 2.10 | 2.05 | 0.066 | 3.253 | 0.062 | 0.25 | 0.044 | 0.079 | | 1328 | 22.2 | 9 |
| Foils | 102 | 14.2 | 0.48 | 25.5 | 2.12 | 2.02 | 0.057 | 3.326 | 0.041 | 12.05 | 0.006 | 0.161 | 0.334 | 825 | 15.7 | 6 |
| for | 103 | 4.5 | 0.29 | 25.7 | 0.55 | 2.07 | 0.057 | 2.285 | 0.047 | 17.77 | 0.026 | | 0.266 | 1410 | 11.8 | 15 |
| Comparison | 104 | 16.8 | 1.02 | 25.1 | 0.11 | 4.15 | 0.055 | 2.236 | 0.022 | 11.02 | | | | 1020 | 16.5 | 15 |
| | 105 | 8.5 | 1.11 | 24.9 | 0.69 | 0.23 | 0.059 | 4.116 | 0.044 | 11.09 | 0.013 | | | 1015 | 7.1 | 10 |
| | 106 | 8.1 | 1.85 | 21.1 | 0.54 | 18.6 | 0.052 | 0.560 | 0.069 | 11.15 | 0.057 | 1.774 | | 1394 | 11.5 | 5 |
| | 107 | 11.7 | 1.45 | 0.25 | 0.53 | 1.85 | 0.322 | 1.220 | 0.071 | 5.536 | 0.062 | 2.210 | 1.156 | 1140 | 47.1 | 460 |
| | 108 | 6.9 | 1.03 | 2.23 | 0.07 | 8.15 | 0.401 | 1.814 | 0.102 | 2.288 | 0.060 | | 2.563 | 1161 | 2.3 | 220 |
| | 109 | 10.3 | 0.52 | 1.22 | 1.11 | 8.68 | 0.006 | 0.536 | 0.115 | 7.156 | | 0.256 | | 1042 | 1.1 | 15 |
| | 110 | 14.4 | 0.66 | 0.53 | 2.12 | 6.22 | 0.425 | 0.081 | 0.332 | 4.425 | | | 4.48 | 1105 | 1.7 | 12 |
| | 111 | 7.1 | 0.18 | 15.1 | 4.84 | 1.45 | 0.965 | 7.441 | 0.229 | 3.168 | 0.090 | | 0.111 | 1366 | 15.6 | 13 |
| | 112 | 12.6 | 0.57 | 15.2 | 2.05 | 3.57 | 0.054 | 1.162 | 0.014 | 14.70 | 0.252 | 3.125 | | 929 | 31.5 | 81 |

TABLE 3

Chemical Compositions of Bonded Metals (in mass percent)

| | C | Si | Mn | Cr | Mo | Ni | W | Co | N |
|---|---|---|---|---|---|---|---|---|---|
| A | 0.225 | 0.310 | 0.506 | 2.24 | 1.06 | 0.21 | 1.01 | 3.15 | 0.006 |
| B | 0.103 | 0.223 | 0.505 | 9.10 | 0.50 | 0.12 | 2.20 | — | 0.241 |
| C | 0.227 | 0.105 | 0.660 | 10.53 | 0.56 | 0.28 | 1.16 | 3.10 | 0.467 |
| D | 0.033 | 0.150 | 4.20 | 19.06 | 2.25 | 26.0 | 2.66 | 2.01 | 0.022 |
| E | 0.006 | 1.525 | 16.75 | 16.33 | 4.05 | 8.11 | — | — | 0.016 |
| F | 0.020 | 0.250 | 0.505 | 28.16 | 3.55 | 62.69 | — | — | 0.009 |

Industrial Advantages of the Invention

As described above, this invention provides alloy foils for liquid-phase diffusion bonding in oxidizing atmospheres that produce bonded joints with extremely high fracture strength between heat-resisting metals, thus making a valuable contribution to the development of industries.

What is claimed is:

1. Alloy foil for liquid-phase diffusion bonding of heat-resisting metals in an oxidizing atmosphere comprising 6.0 to 15.0 percent silicon, 0.1 to 2.0 percent manganese, 0.50 to 30.0 percent chromium, 0.10 to 5.0 percent molybdenum, 0.50 to 10.0 percent vanadium, 0.02 to 1.0 percent niobium, 0.10 to 5.0 percent tungsten, 0.05 to 2.0 percent nitrogen, 0.50 to 20.0 percent phosphorus, all by mass, and the balance comprising nickel and impurities, and having a thickness of 3.0 to 300 μm.

2. Alloy foil for liquid-phase diffusion bonding of heat-resisting metals in an oxidizing atmosphere comprising 6.0 to 15.0 percent silicon, 0.1 to 2.0 percent manganese, 0.50 to 30.0 percent chromium, 0.10 to 5.0 percent molybdenum, 0.50 to 10.0 percent vanadium, 0.02 to 1.0 percent niobium, 0.10 to 5.0 percent tungsten, 0.05 to 2.0 percent nitrogen, 0.50 to 20.0 percent phosphorus, 0.005 to 1.0 percent carbon, all by mass, the ratio of carbon to nitrogen in mass percent being less than 1, and the balance comprising nickel and impurities, and having a thickness of 3.0 to 300 μm.

3. Alloy foil for liquid-phase diffusion bonding of heat-resisting metals in an oxidizing atmosphere comprising 6.0 to 15.0 percent silicon, 0.1 to 2.0 percent manganese, 0.50 to 30.0 percent chromium, 0.10 to 5.0 percent molybdenum, 0.50 to 10.0 percent vanadium, 0.02 to 1.0 percent niobium, 0.10 to 5.0 percent tungsten, 0.05 to 2.0 percent nitrogen, 0.50 to 20.0 percent phosphorus, at least one selected from the group consisting of 0.01 to 5.0 percent titanium and 0.01 to 5.0 percent zirconium, all by mass, and the balance comprising nickel and impurities, and having a thickness of 3.0 to 300 μm.

4. Alloy foil for liquid-phase diffusion bonding of heat-resisting metals in an oxidizing atmosphere comprising 6.0 to 15.0 percent silicon, 0.1 to 2.0 percent manganese, 0.50 to 30.0 percent chromium, 0.10 to 5.0 percent molybdenum, 0.50 to 10.0 percent vanadium, 0.02 to 1.0 percent niobium, 0.10 to 5.0 percent tungsten, 0.05 to 2.0 percent nitrogen, 0.50 to 20.0 percent phosphorus, 0.005 to 1.0 percent carbon, at least one selected from the group consisting of 0.01 to 5.0 percent titanium and 0.01 to 5.0 percent zirconium, all by mass, the ratio of carbon to nitrogen in mass percent being less than 1, and the balance comprising nickel and impurities, and having a thickness of 3.0 to 300 μm.

5. Alloy foil for liquid-phase diffusion bonding of heat-resisting metals in an oxidizing atmosphere according to claim 1 that have a substantially vitreous structure.

6. Alloy foil for liquid-phase diffusion bonding of heat-resisting metals in an oxidizing atmosphere according to claim 2 that have a substantially vitreous structure.

7. Alloy foil for liquid-phase diffusion bonding of heat-resisting metals in an oxidizing atmosphere according to claim 4 that have a substantially vitreous structure.

8. Alloy foil for liquid-phase diffusion bonding of heat-resisting metals in an oxidizing atmosphere according to claim 3 that have a substantially vitreous structure.

* * * * *